United States Patent
Yi et al.

(10) Patent No.: US 8,470,941 B2
(45) Date of Patent: Jun. 25, 2013

(54) CATALYST FOR HOMOPOLYMERIZING AND COPOLYMERIZING PROPYLENE AND ITS PREPARATION AND USE

(75) Inventors: Jianjun Yi, Beijing (CN); Baozuo Yin, Tianjin (CN); Chunming Cui, Tianjin (CN); Zhifei Li, Beijing (CN); Liang Cui, Beijing (CN); Huashu Li, Tianjin (CN); Weihuan Huang, Beijing (CN); Jianying Zhang, Tianjin (CN); Li Wang, Beijing (CN)

(73) Assignee: PetroChina Company Limited, Beijing (CN)

( * ) Notice: Subject to any disclaimer, the term of this patent is extended or adjusted under 35 U.S.C. 154(b) by 54 days.

(21) Appl. No.: 13/127,591

(22) PCT Filed: Dec. 2, 2008

(86) PCT No.: PCT/CN2008/001960
§ 371 (c)(1),
(2), (4) Date: May 4, 2011

(87) PCT Pub. No.: WO2010/051658
PCT Pub. Date: May 14, 2010

(65) Prior Publication Data
US 2011/0207900 A1      Aug. 25, 2011

(30) Foreign Application Priority Data

Nov. 7, 2008    (CN) .......................... 2008 1 0226206

(51) Int. Cl.
*C08F 4/44* (2006.01)
(52) U.S. Cl.
USPC ...................................................... 526/123.1
(58) Field of Classification Search
USPC ...................................................... 526/123.1
See application file for complete search history.

(56) References Cited

U.S. PATENT DOCUMENTS

| | | |
|---|---|---|
| 4,544,717 A | 10/1985 | Mayr et al. |
| 6,048,818 A | 4/2000 | Morini et al. |
| 6,143,684 A | 11/2000 | Morini et al. |
| 6,281,301 B1 | 8/2001 | Morini et al. |
| 6,294,497 B1 | 9/2001 | Morini et al. |
| 6,818,583 B1 | 11/2004 | Morini et al. |
| 7,005,487 B2 * | 2/2006 | Balbontin et al. ............. 526/142 |
| 2004/0235643 A1 * | 11/2004 | Vitale et al. ................... 502/102 |
| 2006/0029605 A1 | 2/2006 | Huang et al. |

FOREIGN PATENT DOCUMENTS

| | | |
|---|---|---|
| EP | 0 361 494 | 4/1990 |
| EP | 0 589 474 A2 | 3/1994 |
| EP | 0 728 769 A1 | 8/1996 |
| GB | 2 111 066 A | 11/1981 |
| JP | 61213209 A * | 9/1986 |
| WO | WO 99/57160 | 11/1999 |
| WO | WO 00/26259 | 5/2000 |
| WO | WO 02/30998 A1 | 4/2002 |
| WO | WO 03/002617 A1 | 1/2003 |

OTHER PUBLICATIONS

English Translation of JP 61213209 A (Sep. 1986).*
Forte et al., "Highly Active Magnesium Chloride Supported Ziegler-Natta Catalysts with Controlled Morphology," Eur. Polym. J. 32(2), 1996, pp. 223-231.*

* cited by examiner

*Primary Examiner* — Ling Choi
*Assistant Examiner* — Catherine S Branch
(74) *Attorney, Agent, or Firm* — Woodard, Emhardt, Moriarty, McNett & Henry LLP

(57) ABSTRACT

A catalyst for homopolymerizing and copolymerizing propylene and its preparation and use. The catalyst component includes titanium compound containing at least one Ti-halogen bond and at least two kinds of electron donor compounds A and B supported on $MgCl_2 \cdot nROH$ adduct, wherein the electron donor compound A is a compound of formula (I), the electron donor compound B is ester or ether compound; the molar ratio between compound A and compound B is 0.1-5; the molar ratio between the total amounts of the two kinds of electron donors and $MgCl_2 \cdot nROH$ is 0.01-1, based on the amount of $MgCl_2 \cdot nROH$; and the molar ration between the titanium compound containing Ti-halogen bond and $MgCl_2 \cdot nROH$ is 1-200. The catalyst has high activity, high stereospecificity and good copolymerization performance. In addition, the morphology of the polymer obtained therefrom is good.

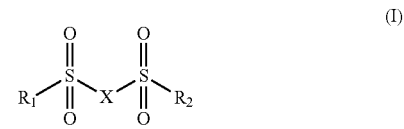

(I)

24 Claims, No Drawings

CATALYST FOR HOMOPOLYMERIZING AND COPOLYMERIZING PROPYLENE AND ITS PREPARATION AND USE

CROSS-REFERENCE TO RELATED APPLICATIONS

This application is a National Stage of International Application PCT/CN08/01960, filed Dec. 2, 2008, claiming priority to Chinese Application No. 200810226206.0, filed Nov. 7, 2008. The present application claims priority to PCT/CN08/01960 and to Chinese Application No. 200810226206.0.

FIELD OF THE INVENTION

The present invention relates to a catalyst for homopolymerizing and copolymerizing propylene containing at least two kinds of electron donor compounds and its preparation.

BACKGROUND OF THE INVENTION

Catalysts containing titanium compound supported on active magnesium halide, and electron donor compound are well known in the art.

U.S. Pat. No. 4,544,717 discloses that the stereospecificity of catalysts can be improved by adding electron donor compounds (i.e. internal electron donor) to solid component containing titanium compound. GB 2,111,066 discloses that contacting magnesium chloride alcohol adduct with liquid titanium compound, adding a kind of electron donor (such as phthalates) simultaneously to form solid titanium catalysts, and adding another kind of electron donor (alkoxy silicon compound) during the polymerization of olefins, both of the activity and specificity of such catalysts can be substantially improved, and the processes of deliming and removing random materials can be eliminated. So far, various kinds of internal electron donor compounds suitable for preparing Z—N catalysts and catalysts for olefin polymerization containing such internal electron donor compounds have been disclosed in many patents.

Such internal electron donor compounds mainly include: 1,3-diketones compounds described in Japanese patent JP61231008, isocyanates compounds described in U.S. Pat. No. 6,143,684, succinates compounds described in European patents EP1165113 and EP1088009, 1,3-diethers compounds described in European patents EP0361494 and EP0728769, alkoxyketones compounds described in Chinese patent CN1850868, alkoxyesters compounds in Chinese patent CN1446787, malonate esters compounds described in U.S. Pat. No. 6,281,301, U.S. Pat. No. 6,294,497, U.S. Pat. No. 6,048,818 and PCT international application WO0026259 and diamines compounds described in Chinese patent CN1087918.

Using different internal electron donor compounds make the catalysts thus prepared have different properties. For example, some catalysts have higher activity, some catalysts have better hydrogen sensitivity, and polyolefin resin made from some catalysts has wider molecular weight distribution, and the like. However, in the industrial production of polyolefin, it is very desirable that the catalysts used have good comprehensive properties. In the prior art, various kinds of internal electron donor compounds are added during the preparation of catalysts so as to improve the comprehensive properties of catalysts. The preparation of catalysts component and catalysts for olefin polymerization by using two or more kinds of internal electron donor compounds simultaneously has been described in the publication patents JP2001139621, JP2002249507, WO9957160, KR20000026517, WO0230998, WO03002617, etc., but the results are not satisfactory. Generally, although the molecular weight distribution of the resulted polymer can be widen due to utilization of two or more kinds of internal electron donor compounds, the activity of catalyst then decreases.

SUMMARY OF THE INVENTION

The object of the invention is to select at least two kinds of internal electron donor compounds, one of which is sulphonyl compound with special structure, in order to prepare a catalyst with good comprehensive properties. The present catalyst exists high activity and stereospecificity when used for olefin polymerization and copolymerization.

The present invention provides a catalyst for homopolymerizing and copolymerizing propylene, wherein the catalyst consists of titanium compound containing at least one Ti-halogen bond and two kinds of electron donor compounds A and B supported on $MgCl_2 \cdot nROH$ adduct, wherein n is 1.5-4, R is $C_1$-$C_4$ alkyl;

the electron donor compound A is a sulphonyl compound having formula (I),

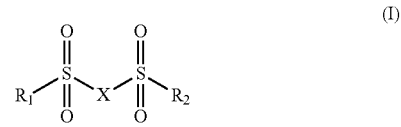

wherein,

X can be selected from the group consisting of unsubstituted Group 14, unsubstituted Group 15 and unsubstituted Group 16 elements of the Periodic Table of the Elements; or X can be selected from the group consisting of disubstituted Group 14 and monosubstituted Group 15 elements with a substituent which can be monocycle, polycycle, heteroatom-containing cyclic group or various aliphatic chainlike groups; $R_1$ and $R_2$ can be the same or different, and can be hydrogen atom, halogen, unsubstituted or substituted alkyl, cycloalkyl, aryl, aralkyl, alkylaryl or heteroatom-containing ring, respectively.

The electron donor compound B can be ester or ether compound.

The electron donor compound A in the catalyst component of the invention is sulphonyl compound having the structure of formula (I), wherein X can be $C(R_3)(R_4)$, $Si(R_3)(R_4)$, $Sn(R_3)(R_4)$, $Pb(R_3)(R_4)$, $N(R_5)$, $P(R_6)$, $As(R_6)$, O, S, Se, Te; wherein $R_3$ and $R_4$ can be the same or different, and $R_3$, $R_4$, $R_5$ and $R_6$ is hydrogen atom, halogen, (substituted) alkyl, cycloalkyl, aryl, aralkyl, alkylaryl, alkyl alkenyl, alkenyl alkyl, alkyl alkynyl, heteroatom-containing ring or acyl, respectively, or $R_3$ and $R_4$ and C constitute cycloalkyl or cycloalkenyl. In other words, the sulphonyl-containing compound is disulphonyl alkane, disulphonyl olefin, disulphonyl cyclic hydrocarbon, disulphonyl silane, disulphonyl cyclosilane, disulphonyl dialkyl tin, disulphonyl dialkyl lead or heteroatom-containing derivatives; disulphonyl imine; disulphonyl phosphinidene; disulphonyl arsenous or heteroatom-containing derivatives; (substituted) sulphonic anhydride, thio or seleno derivatives.

Specifically available for:
di(trifluoromethylsulphonyl)methane;
[di(trifluoromethylsulphonyl)methyl]benzene;
1,1-di(trifluoromethylsulphonyl)-ethane;

[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethyl-amine;
[3,3-di-(trifluoromethylsulphonyl)-allyl]benzene;
1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitro-benzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;
1-[di-(trifluoromethylsulphonyl)-methylene]-pyrimidine;
[di-(trifluoromethylsulphonyl)-methylene]-triphenyl-$\lambda^5$-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoro-methane;
di-(trifluoromethylsulphonyl)-vinylketone;
2,2-di-(trifluoromethylsulphonyl)-malonic ester;
[(dimethyl-$\lambda^4$-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitrobenzene)-hydrazine;
2,2-di-(isopropylamine)-1,1-(trifluoromethylsulphonyl)-ethylene;
1-(2,2-di-trifluoromethylsulphonyl-cyclopropyl)-ethanone;
1-(2,2-di-trifluoromethylsulphonyl-ethenyl)-4-methyl-benzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrfluoro-benzene;
1-(di-trifluoromethylsulphonyl-methyl)-4-tetra-but-2,3,5,6-tetrfluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrfluoro-4-hexyloxy-benzene;
N-phenyl-di(trifluoromethylsulphonyl)amine;
N-2,6-diisopropylphenyl-di(trifluoromethylsulphonyl) amine;
N-(4-methoxylphenyl)-di(trifluoromethylsulphonyl)amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxylethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl)amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene.

The electron donor compound B in the catalyst component of the invention is one or more-membered aliphatic carboxylic ester, aromatic carboxylic ester or diethers compounds.

Wherein, the one or more-membered aliphatic carboxylic ester or aromatic carboxylic ester can be benzoates, phthalates, malonates, succinates, glutarates, pivalates or carbonates, etc. For example, ethyl benzoate, diethyl phthalate, di-n-butyl ortho-phthalate, diisobutyl phthalate, di-n-octyl phthalate, diisooctyl phthalate, diethylmalonate, dibutylmalonate, diethyl 2,3-diisopropyl succinate, di-n-butyl 2,3-diisopropyl succinate, diisobutyl 2,3-diisopropyl succinate, dimethyl 2,3-diisopropyl succinate, diisobutyl 2,2-dimethyl succinate, diisobutyl 2-ethyl-2 methyl succinate, diethyl 2-ethyl-2 methyl succinate, diethyl adipate, dibutyl adipate, diethyl sebacate, dibutyl sebacate, diethyl maleate, di-n-butyl maleate, diethyl naphthalene dicarboxylate, dibutyl naphthalene dicarboxylate, triethyl trimellitate, tributyl trimellitate, tributyl biphenyl-tricarboxylate, triethyl biphenyl-tricarboxylate, tetraethyl pyromellitate or tetrabutyl pyromellitate.

Diethers compound can be 1,3-diethers of formula (II), wherein $R_1$, $R_2$, $R_3$, $R_4$, $R_5$ and $R_6$, identical or different, can be one of hydrogen, halogen atoms, linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl, and $R_7$ and $R_8$, identical or different, can be selected from one of linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; $R_1$-$R_6$ groups can form a ring by linkage. Preferably, $R_7$ and $R_8$ can be 1,3-diethers of $C_1$-$C_4$ alkyl.

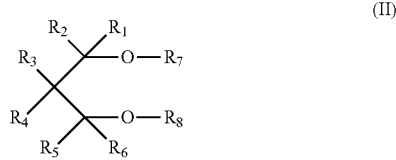

(II)

Such 1,3-diethers compounds are disclosed in Chinese patent ZL89108368.5 and Chinese patent CN1041752A, the relevant contents of each of which is incorporated herein by reference.

To sum up, in addition to the above electron donor compounds A and B, the catalyst component of the invention can also include titanium, magnesium and halogen. More preferably, the catalyst component is the reaction product between titanium compound containing at least one Ti-halogen bond and the above electron donor compounds supported on a halide of magnesium (preferably $MgCl_2$.nROH adduct).

A general method is to support the reaction product between titanium compound containing at least one Ti-halogen bond and the above two kinds of electron donor compounds A and B on $MgCl_2$.nROH adduct, wherein $MgCl_2$.nROH adduct is the adduct of magnesium dichloride and alcohol, preferably as spherical particles, wherein n is usually 1.5-4, preferably 1.9-3.6; R is $C_1$-$C_4$ alkyl, the $C_1$-$C_4$ alcohol includes methanol, ethanol, n-propanol, isopropanol, n-butanol or isobutanol.

The formula of titanium compound containing at least one Ti-halogen bond can be $TiX_n(OR)_{4-n}$, wherein R is $R_1$-$R_{20}$ alkyl, preferably n-butyl/isobutyl, 2-ethylhexyl, n-octyl and phenyl; X is halogen, n is 1-4. The titanium compound is specifically selected from titanium tetrahalide, most preferably titanium tetrachloride; trichlorooxyltitanium, especially trichlorobutoxytitanium and trichlorophenoxytitanium; tetraalkoxytitanium, especially tetraethoxytitanium.

The above $MgCl_2$.nROH adduct particles are reacted with various kinds of electron donor compounds and titanium compound of the invention so as to finally yield the catalyst component of the invention.

Based on the amount of $MgCl_2$.nROH, the molar ratio between total amount of the two kinds of electron donor compounds A and B and $MgCl_2$.nROH is 0.01-1; the molar ratio between titanium compound containing Ti-halogen bond and $MgCl_2$.nROH is 1-200.

The preparation steps are detailed as follows:
(i) adding spherical magnesium chloride alcohol adduct particles to the solution of titanium tetrachloride, at the reaction temperature of from −40 to 0° C. for from 0.5 to 3 hours;
(ii) heating up gradually to 40-100° C., and adding one or two kind(s) of internal electron donor, and reacting for 0.5-3 h;
(iii) filtering, if one kind of internal electron donor being added in step (2), then the other kind of internal electron donor compound being added in this step, adding certain amount of titanium tetrachloride, reacting for 0.5-3 h, filtering, repeating the steps of adding titanium tetrachloride and filtering 1-3 times; and
(iv) washing, drying and thus obtaining spherical solid catalyst.

With respect to the above method, spherical magnesium chloride alcohol adduct and titanium compound may react with each other several times, at least one of the processing temperature ranging from −40 to 0° C., preferably −30-0° C.; another processing temperature ranging from 80 to 140° C., preferable 90-130° C.; total amount of titanium compound, based on Ti/Mg molar ratio, is in the range of 1-200, preferably 10-100; the electron donor in step (2) is sulphonyls compounds and esters and ethers compounds for apart from sulphonyls compounds, as mentioned hereinabove. Two or more kinds of electron donor compounds can be added simultaneously or step by step. If added step by step, sulphonyls compounds may be added first, and then another kind(s) of compound(s) such as esters and ethers are added, this adding sequence may be reversed. Two kinds of electron donor compounds are preferably to be used in different steps under different conditions. As for the amount, the molar ratio between compounds A and B is usually 0.1-5, preferably 0.2-3.

The solid catalyst component of the invention and organoaluminum compound together constitute the catalyst for olefin polymerization and copolymerization according to the given method.

The object of the invention is to provide a catalyst for α-olefin $CH_2$=CHR polymerization and copolymerization, wherein R is hydrogen or $C_1$-$C_{12}$ alkyl. The catalyst comprises the reaction product among the following compounds:
(1) a solid catalyst component containing Mg, Ti and halogen and electron donor compound as described above;
(2) an alkylaluminium compound; and
(3) one or more kind(s) of external electron donor compound(s).

The alkylaluminium compound is preferably the compound of formula $AlR_nX_{(3-n)}$, wherein R is $C_1$-$C_{20}$ alkyl, aralkyl, aryl; X is halogen; n is an integer in the range of $0 \leq n \leq 3$; trimethyl aluminium, triethyl aluminum, triisobutyl aluminium, trioctyl aluminum; aluminum diethyl monohydrogen, aluminum diisobutyl monohydrogen, aluminium diethyl monochloride, aluminium diisobutyl monochloride, and aluminium ethyl dichloride. Further, triethyl aluminum and triisobutyl aluminium are preferable.

The alkylaluminium can be used in an amount so that the molar ratio between aluminium and titanium in solid catalyst component (1) is 10-3000, preferably 20-1000.

The external electron donor is siloxane compound of formula $R_nSi(OR_1)_{4-n}$, wherein R is $C_1$-$C_{10}$ alkyl, cycloalkyl or aryl, $R_1$ is $C_1$-$C_4$ alkyl, n is an integer in the range of $0 \leq n \leq 3$, for example, phenyltrimethoxysilane (PTMS), phenyltriethoxysilane (PTES), diphenyldimethoxysilane (DPDMS), preferably phenyltriethoxysilane, diphenyldimethoxysilane, cyclohexylmethyldimethoxysilane and diphenyldiethoxysilane.

In addition, the external electron donor of the catalyst of the invention may use 1,3-diether disclosed in Chinese patent ZL89108368.5 and CN1041752A, and succinate disclosed in Chinese patent CN1313869A.

The external electron donor (3) is used in an amount so that the molar ratio between organoaluminum compound and the external electron donor compound is 0.1-500, preferably 1-300, and more preferably 4-100.

The polymerization and copolymerization of olefin are proceeded according to given method, in the liquid phase bulk or in the solution of bulk in the inert solvent, or in gaseous phase, or operating through the combination polymerization processes in gaseous and liquid phase. Temperature for polymerization is usually 0-150° C., and preferably 50-100° C. The pressure for polymerization is ordinary pressure or higher.

The propylene atmospheric slurry polymerization and high-pressure bulk polymerization of the catalyst of the invention are proceeded according to given method, the copolymerization between ethylene and propylene is carried out as follows: homopolymerizing propylene with the catalyst of the invention first, then introducing it into the prepared gas mixture of ethylene, propylene and hydrogen, copolymerizing under certain stirring rate and temperature for a certain period of time, and then cooling, depressurizing and discharging.

DETAILED DESCRIPTION OF THE INVENTION

The following examples are provided to illustrate further and to facilitate the understanding of the present invention and are not in any way intended to limit the invention.

The preparations of catalyst in the examples are all operated under the protection of high purity nitrogen or argon in the instrument of Schlenk. The examples are as follows.

Example 1

Laboratory Test of Synthesis and Atmospheric Slurry Polymerization 5.0 g spherical $MgCl_2.2.85C_2H_5OH$ support is added into a glass reaction bottle with stirring which is charged with 150 ml $TiCL_4$, and is precooled to −25° C. Then the temperature is gradually heated up to 80° C. 2 mmol internal electron donor N-m-chlorophenyl-di(trifluoromethylsulphonyl)amine is added under this temperature for 30 minutes. Then the temperature is heated up to 130° C. for 2 hours. Followed by filtering, then 120 ml $TiCl_4$ and 2 mmol internal electron donor di-n-butyl o-phthalate are added at 130° C. for 2 hours. Then n-hexane is used to wash 6 times, and finally the solid is dried under vacuum. 3.2 g spherical solid catalyst component of the invention is thus obtained.

The spherical catalyst component is measured according to B.E.T. method to have a specific surface area of 335 $m^2/g$, specific pore volume of 0.36 ml/g, and a porosity distribution of 62% pores having a pore radius of less than 100 Å. The content of titanium thereof is 2.13% (wt.). And the X-ray spectrum of catalyst component does not have diffraction peak at 2θ of 14.95° and 35°, while has a halo with maximum intensity at 2θ between 30° and 36°.

250 ml dried three-mouth reaction bottle is sufficiently replaced with nitrogen, then with propylene so that pressure of the system is slightly higher than $1.013 \times 10^5$ Pa. 100 ml heptane is added, and heated to about 50° C. Then certain amount of $AlEt_3$ is added. The external electron donor diphenyldiethoxysilane is added thereafter. Then catalyst is added under constant temperature, remaining for 1 h. 100 ml hydrochloric acid-ethanol solution (with 5% hydrochloric acid) is added to terminate the reaction. The polymer is washed with absolute ethanol and dried under vacuum to yield 3.4 g polypropylene. The activity of the catalyst is 10614 g polymer/g (Ti) $h^{-1}$, and isotacticity of which is 98.2%.

Example 2

Small-Scale Test of Synthesis and Atmospheric Slurry Polymerization 5.0 g spherical $MgCl_2.2.85C_2H_5OH$ support is added into a glass reaction bottle with stirring which is charged with 150 ml $TiCl_4$, and is precooled to −25° C. Then the temperature is gradually heated up to 80° C. 2 mmol internal electron donor di-n-butyl o-phthalate is added under this temperature for 30 minutes. Then the temperature is heated up to 130° C. for 2 hours. Followed by filtering, then 120 ml $TiCl_4$ and 2 mmol internal electron donor N-m-chlorophenyl-di(trifluoromethylsulphonyl)amine are added at 130° C. for 2 hours. Then n-hexane is used to wash 6 times, and finally the solid is dried under vacuum. 3.3 g spherical solid catalyst component of the invention is thus obtained.

The spherical catalyst component is measured according to B.E.T. method to have a specific surface area of 321 $m^2/g$, specific pore volume of 0.37 ml/g, and a porosity distribution of 74% pores having a pore radius of less than 100 Å. The content of titanium thereof is 2.30% (wt.). And the X-ray spectrum of catalyst component does not have diffraction peak at 2θ of 14.95° and 35°, while has a halo with maximum intensity at 2θ between 30° and 36°.

The process of atmospheric slurry polymerization is the same as that of Example 1, except that the addition amount of spherical solid catalyst is 14.6 mg, the activity of the catalyst is 7608 g polymer/g (Ti) $h^{-1}$, and isotacticity of which is 97.5%.

Example 3

The preparation method is the same as that of Example 1, except that the addition amount of internal electron donor N-m-chlorophenyl-di(trifluoromethylsulphonyl)amide is 1 mmol, and 3.1 g catalyst is thus obtained. The content of titanium is 2.53% (wt.), the activity of the catalyst is 9061 g polymer/g (Ti) $h^{-1}$, and isotacticity of which is 94.3%.

Example 4

The preparation method is the same as that of Example 1, except that the addition amount of internal electron donor N-m-chlorophenyl-di(trifluoromethylsulphonyl)amide is 1 mmol, and 3.0 g catalyst is thus obtained. The content of titanium is 2.58% (wt.), the activity of the catalyst is 8061 g polymer/g (Ti) $h^{-1}$, and isotacticity of which is 95.6%.

Example 5

The preparation method is the same as that of Example 1, except that the addition amount of internal electron donor di-n-butyl o-phthalate is 1 mmol, and 2.9 g catalyst is thus obtained. The content of titanium is 2.49% (wt.), the activity of the catalyst is 7123 g polymer/g (Ti) $h^{-1}$, and isotacticity of which is 96.2%.

Example 6

The preparation method is the same as that of Example 1, except that the addition amount of internal electron donor di-n-butyl o-phthalate is 1 mmol, and 3.1 g catalyst is thus obtained. The content of titanium is 2.62% (wt.), the activity of the catalyst is 8012 g polymer/g (Ti) h$^{-1}$, and isotacticity of which is 97.1%.

Example 7

The preparation method is the same as that of Example 1, except that the internal electron donor di-n-butyl o-phthalate is changed to diisobutyl o-phthalate, the addition amount of which is not changed, and 3.3 g catalyst is thus obtained. The content of titanium is 2.21% (wt.), the activity of the catalyst is 13540 g polymer/g (Ti) h$^{-1}$, and isotacticity of which is 96.2%.

Example 8

5.0 g spherical MgCl$_2$.2.85C$_2$H$_5$OH support is added into a glass reaction bottle with stirring which is charged with 150 ml TiCl$_4$, and is precooled to −25° C. Then the temperature is gradually heated up to 80° C. 2 mmol internal electron donor N-m-chlorophenyl-di(trifluoromethylsulphonyl)amide is added under this temperature for 30 minutes. Then the temperature is heated up to 130° C. for 2 hours. Followed by filtering, then 120 ml TiCl$_4$ and 2 mmol internal electron donor 2,2-diisopropyl-1,3-dimethoxypropane are added at 130° C. for 2 hours. Then n-hexane is used to wash 6 times, and finally the solid is dried under vacuum. 3.4 g spherical solid catalyst component of the invention is thus obtained.

The process of atmospheric slurry polymerization is the same as that of Example 1, except that the addition amount of spherical solid catalyst is 13.9 mg. The content of titanium is 2.41% (wt.), the activity of the catalyst is 9608 g polymer/g (Ti) h$^{-1}$, and isotacticity of which is 98.3%.

Example 9

The preparation method is the same as that of Example 8, except that the internal electron donor is changed to 2-diisopropyl-2-cyclohexylmethyl-1,3-dimethoxypropane, the addition amount of which is not changed. 3.2 g catalyst is thus obtained. The content of titanium is 2.43% (wt.), The process of atmospheric slurry polymerization is the same as that of Example 1, except that the addition amount of spherical solid catalyst is 13.7 mg, the activity of the catalyst is 9710 g polymer/g (Ti) h$^{-1}$, and isotacticity of which is 98.4%.

Example 10

Small-Scale Test of Synthesis and High-Pressure Bulk Polymerization

The process of preparation of catalyst is the same as that of Example 1, except that propylene polymerization is carried out by high-pressure bulk process. The steps are as follows:

In a 5 L autoclave, nitrogen airflow is purged for 1 hour at 70° C. 5 ml hexane solution of triethyl aluminum (concentration of triethyl aluminum is 0.5 mmol/ml), 1 ml hexane solution of cyclohexyldimethoxysilane (CHMMS) (concentration of CHMMS is 0.1 mmol/ml), 10 ml anhydrous hexane and 9 mg solid catalyst component are introduced into nitrogen airflow at room temperature. The autoclave is closed and 0.5 g hydrogen and 1.5 kg liquid propylene are introduced. The temperature is heated up to 70° C. within 15 minutes' stirring. After polymerization at 70° C. for 2 hours, stirring is stopped, and propylene monomer which is not polymerized is removed. Then the polymer is collected and dried under vacuum for 2 hours at 60° C. and then weighed. The weight is used for activity calculating (AC). The isotacticity (I.I) of the polymer is measured by boiling n-heptane extraction process.

Results: activity 29000 g PP/gcat, isotacticity 98.42%, Mw=351911, Mw/Mn=4.55.

Example 11

Propylene polymerization (atmospheric slurry): using the spherical solid catalyst component prepared in Example 1. The addition amount is 11.2 mg. Other polymerizing conditions are the same as those of Example 1 except that diphenyldiethoxysilane is changed to phenyltriethoxysilane of same mole number. 2.0 g polypropylene is thus obtained. The activity of the catalyst is 8450 g polymer/g (Ti) h$^{-1}$, and isotacticity of which is 96.7%.

Example 12

Propylene polymerization (high-pressure bulk): using the spherical solid catalyst component prepared in Example 1. The addition amount is 12.3 mg. Other polymerizing conditions are the same as those of Example 1 except that diphenyldiethoxysilane is changed to diphenyldimethoxysilane of same mole number. 295.2 g polypropylene is thus obtained. The activity of the catalyst is 24000 g PP/gcat, isotacticity is 97.1%, Mw=326376, Mw/Mn=4.14.

Example 13

The preparation of propylene block copolymer: homopolymerization of propylene is first carried out by using the spherical polypropylene solid catalyst component prepared in Example 1 according to the high-pressure bulk of Example 2. The addition amount of solid catalyst component is 11.5 mg. After polymerizing for 2 hours at 70° C., vent valve is opened to decrease the pressure to normal pressure. After that, ethylene and propylene are copolymerized according to the following method.

The prepared gas mixture of ethylene, propylene and hydrogen (the molar ratio of various components in the mixture is: C$^=_2$/C$^=_3$/H$_2$=8/1/0.1) is fed into the reactor, the pressure of which is remained at 0.1 MPa by adjusting the size of intake valve. The reaction is undergone for 30 minutes at 75° C., followed by cooling, depressurizing and discharging.

667 g polymer is thus obtained. The activity of the catalyst is 58000 g PP/gcat; bulk density of the polymer is 0.49 g/ml, melt index of the polymer (MFR)=3.1 g/10 min, and ethylene content of the polymer is 8.8% (wt.).

Example 14

The preparation method and steps of propylene block copolymer are identical to those of Example 11, also using the spherical polypropylene solid catalyst component prepared in Example 1, except that the proportion of gas mixture is changed (the molar ratio of various components in the gas mixture is: C$^=_2$/C$^=_3$/H$_2$=7/1/0.1), and the addition amount of solid catalyst component is 10.3 mg. 676.9 g polymer is thus obtained. The activity of the catalyst is 65717 g PP/gcat; bulk density of the polymer is 0.48 g/ml, melt index of the polymer (MFR)=3.0 g/10 min, and ethylene content of the polymer is 9.0% (wt.).

Example 15

The preparation method and steps of propylene block copolymer are identical to those of Example 11, also using the spherical polypropylene solid catalyst component prepared in Example 1, except that the proportion of gas mixture is changed (the molar ratio of various components in the gas mixture is: $C^=_2/C^=_3/H_2$=6/1/0.1), and the addition amount of solid catalyst component is 10.8 mg. 719.9 g polymer is thus obtained. The activity of the catalyst is 66655.8 g PP/gcat; bulk density of the polymer is 0.47 g/ml, melt index of the polymer (MFR)=3.1 g/10 min, and ethylene content of the polymer is 9.1% (wt.).

Example 16

The preparation method and steps of propylene block copolymer are identical to those of Example 11, also using the spherical polypropylene solid catalyst component prepared in Example 1, except that the proportion of gas mixture is changed (the molar ratio of various components in the gas mixture is: $C^=_2/C^=_3/H_2$=5/1/0.1), and the addition amount of solid catalyst component is 11.8 mg. 849.3 g polymer is thus obtained. The activity of the catalyst is 71975.7 g PP/gcat; bulk density of the polymer is 0.44 g/ml, melt index of the polymer (MFR)=3.2 g/10 min, and ethylene content of the polymer is 9.2% (wt.).

Comparative Example 1

The preparation method and steps of propylene block copolymer are identical to those of Example 11, using CS-II type spherical catalyst, the proportion of gas mixture is according to Example 11 (the molar ratio of various components in the gas mixture is: $C^=_2/C^=_3/H_2$=8/1/0.1), and the addition amount of solid catalyst component is 10.2 mg. 616.5 g polymer is thus obtained. The activity of the catalyst is 60445 g PP/gcat; bulk density of the polymer is 0.46 g/ml, melt index of the polymer (MFR)=3.0 g/10 min, and ethylene content of the polymer is 9.0% (wt.).

Comparative Example 2

The preparation method and steps of propylene block copolymer are identical to those of Example 12, using CS-II type spherical catalyst, the proportion of gas mixture is according to Example 12 (the molar ratio of various components in the gas mixture is: $C^=_2/C^=_3/H_2$=7/1/0.1), and the addition amount of solid catalyst component is 11.2 mg. 665.9 g polymer is thus obtained. The activity of the catalyst is 59458 g PP/gcat; bulk density of the polymer is 0.46 g/ml, melt index of the polymer (MFR)=3.1 g/10 min, and ethylene content of the polymer is 9.1% (wt.).

Comparative Example 3

The preparation method and steps of propylene block copolymer are identical to those of Example 13, using CS-II type spherical catalyst, the proportion of gas mixture is according to Example 13 (the molar ratio of various components in the mixture is: $C^=_2/C^=_3/H_2$=6/1/0.1), and the addition amount of solid catalyst component is 12.1 mg. 795 g polymer is thus obtained. The activity of the catalyst is 65716 g PP/gcat; bulk density of the polymer is 0.45 g/ml, melt index of the polymer (MFR)=3.0 g/10 min, and ethylene content of the polymer is 9.0% (wt.).

Comparative Example 4

The preparation method and steps of propylene block copolymer are identical to those of Example 14, using CS-II type spherical catalyst, the proportion of gas mixture is according to Example 14 (the molar ratio of various components in the mixture is: $C^=_2/C^=_3/H_2$=5/1/0.1), and the addition amount of solid catalyst component is 11.6 mg. 795 g polymer is thus obtained. The activity of the catalyst is 65716 g PP/gcat; bulk density of the polymer is 0.45 g/ml, melt index of the polymer (MFR)=3.1 g/10 min, and ethylene content of the polymer is 9.2% (wt.).

INDUSTRIAL APPLICABILITY

The catalyst of the invention can be directly used for the existing propylene polymerization, such as intermittent liquid phase bulk propylene polymerization, reactor-type continuous liquid phase bulk propylene polymerization, ring-canal continuous liquid phase bulk propylene polymerization, liquid phase bulk-gas phase combination propylene polymerization, so as to produce polypropylene products, such as polypropylene homopolymer or copolymer, etc. The catalyst is used according to the existing operating procedure.

In the method of intermittent liquid phase bulk to produce polypropylene homopolymer, the activity of the catalyst is 50000-90000 g PP/g cat/h, the isotacticity is 94%-99%, and the molecular distribution Mw/Mn is 3-12.

In the method of continuous liquid phase bulk to produce polypropylene homopolymer, the activity of the catalyst is 24000-30000 g PP/g cat/h, and the isotacticity is 94%-99%.

In the method of liquid phase bulk-gas phase combination, ethylene severing as comonomer, to produce polypropylene homopolymer, the activity of the catalyst is 20000-29000 g PP/g cat/h; bulk density of the polymer is 0.38-0.46 g/ml, melt index of the polymer (MFR) is 0.1-100 g/10 min, and ethylene content of the polymer is 3-15 wt %.

In summary, the catalyst of the invention has high activity, high stereo specificity and good copolymerization performance. In addition, the morphology of the polymer obtained therefrom is good. The catalyst of the invention is especially suitable for copolymerization of propylene and other olefins.

The invention claimed is:
1. A catalyst for polymerizing propylene, comprising a titanium compound having at least one Ti-halogen bond, a first electron donor compound A supported on a $MgCl_2 \cdot nROH$ adduct, wherein n is 1.5-4, and R is $C_1$-$C_4$ alkyl, and a second electron donor compound B supported on said $MgCl_2 \cdot nROH$ adduct;
wherein the electron donor compound A is a sulphonyl compound of formula (I):

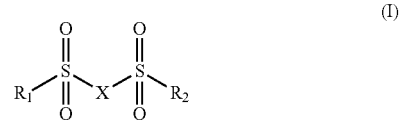

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and mono substituted Group 15 elements with a substituent which can be monocycle, polycycle, heteroatom-containing cyclic group or various aliphatic chainlike groups, and wherein X is C(R$_3$)(R$_4$), Si(R$_3$)(R$_4$), Sn(R$_3$)(R$_4$), Pb(R$_3$)(R$_4$), N(R$_5$), P(R$_6$), As(R$_6$). O, S, Se or Te, wherein R$_3$ and R$_4$ are identical or different, and R$_3$R$_4$R$_5$ and R$_6$ may each be hydrogen, halogen, unsubstituted or substituted alkyl, cycloalkyl, aryl, aralkyl, alkylaryl, alkyl alkenyl, alkenyl alkyl, alkyl alkynyl, heteroatom-containing ring or acyl, respectively, or R$_3$, R$_4$ and C constitute cycloalkyl or cycloalkenyl in the sulphonyl compound of formula (I);

R$_1$ and R$_2$ can be the same or different, and can each be hydrogen, halogen, unsubstituted or substituted alkyl, cycloalkyl, aryl, aralkyl, alkylaryl or heteroatom-containing ring;

and wherein the electron donor compound B is an ester or an ether compound;

and wherein the molar ratio of electron donor compound A to electron donor compound B is between 0.1:1 and 5:1;

and wherein the molar ratio of the total amounts of the two kinds of electron donors to MgCl$_2$.nROH is between 0.01:1 and 1:1;

and wherein the molar ratio of the titanium compound containing Ti-halogen bond to MgCl$_2$.nROH is between 1:1 and 200:1.

2. A catalyst according to claim 1 wherein the sulphonyl compound is disulphonyl alkane, disulphonyl olefin, disulphonyl cyclic hydrocarbon, disulphonyl silane, disulphonyl, cyclosilane, disulphonyl dialkyl tin, disulphonyl dialkyl lead or heteroatom-containing derivatives; disulphonyl imine; disulphonyl phosphinidene; disulphonyl arsenous or heteroatom-containing derivatives; unsubstituted or substituted sulphonic anhydride, thio or seleno derivatives.

3. A catalyst according to claim 1 wherein the sulphonyl compound is selected from the group consisting of:
di(trifluoromethylsulphonyl)methane;
[di(trifluoromethylsulphonyl)methyl]benzene;
1,1-di(trifluoromethylsulphonyl)-ethane;
[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethyl-amine;
[3,3-di-(trifluoromethylsulphonyl)-allyl]-benzene;
1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitrobenzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;
1-[di-(trifluoromethylsulphonyl)-methylene]-pyrimidine;
[di-(trifluoromethylsulphonyl)-methylene]-triphenyl-$\lambda^5$-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoro-methane;
di-(trifluoromethylsulphonyl)-vinylketone;
2,2-di-(trifluoromethylsulphonyl)-malonic ester;
[(dimethyl-$\lambda^4$-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitrobenzene)-hydrazine;
2,2-di-(isopropylamine)-1,1-(trifluoromethylsulphonyl)-ethylene;
1-(2,2-di-trifluoromethylsulphonyl-cyclopropyl)-ethanone;
1-(2,2-di-trifluoromethylsulphonyl-ethenyl)-4-methyl-benzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrafluoro-benzene;

1-(di-trifluoromethylsulphonyl-methyl)-4-tetra-but-2,3,5,6-tetrafluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrifluoro-4-hexyloxy-benzene;
N-phenyl-di(trifluoromethylsulphonyl)amine;
N-2,6-diisopropylphenyl-di(trifluoromethylsulphonyl)amine;
N-(4-methoxylphenyl)-di(trifluoromethylsulphonyl)amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxylethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl)amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene and trifluoromethylsulfonicanhydride.

4. A catalyst according to claim 1 wherein the electron donor compound B is a one or more-membered aliphatic carboxylic ester, an aromatic carboxylic ester or diether compounds.

5. A catalyst according to claim 4 wherein the one or more-membered aliphatic carboxylic ester or aromatic carboxylic ester can be benzoates, phthalates, malonates, succinates, glutarates or pivalates compounds.

6. A catalyst according to claim 4 wherein the diether compounds are 1,3-diethers of formula (II):

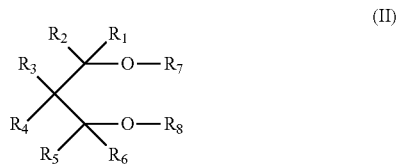

wherein $R_1$, $R_2$, $R_3$, $R_4$, $R_5$ and $R_6$ can be the same or different, and can be hydrogen, halogen atom, linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; $R_7$ and $R_8$ can be the same or different, and can be linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; groups of $R_1$-$R_6$ can form a ring by linkage.

7. A method of preparing a catalyst for polymerizing propylene in nitrogen or argon under normal pressure, the method comprising the steps of:
(i) adding spherical magnesium chloride alcohol adduct particles to a solution of titanium tetrachloride at the reaction temperature of from −40 to 0° C. for 0.5-3 hours;
(ii) heating up gradually to 40-100° C., and adding a first electron donor compound A and/or a second electron donor compound B, and reacting for 0.5-3 hours;
wherein said first electron donor compound A is a sulphonyl compound of formula (I):

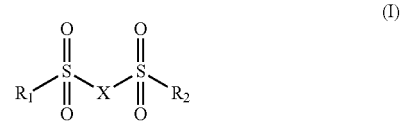

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups, wherein X is $C(R_3)(R_4)$, $Si(R_3)(R_4)$, $Sn(R_3)(R_4)$, $Pb(R_3)(R_4)$, $N(R_5)$, $P(R_6)$, $As(R_6)$, O, S, Se or Te, wherein $R_3$ and $R_4$ are identical or different, and $R_3$, $R_4$, $R_5$ and $R_6$ is hydrogen atom, halogen, unsubstituted or substituted alkyl, cycloalkyl, aryl, aralkyl, alkylaryl, alkyl alkenyl, alkenyl alkyl, alkyl alkynyl, heteroatom-containing ring or acyl, respectively, or $R_3$, $R_4$ and C constitute cycloalkyl or cycloalkenyl in the sulphonyl compound of formula (I);
$R_1$ and $R_2$ can be the same or different, and can each be hydrogen, halogen, unsubstituted or substituted alkyl, cycloalkyl, aryl, aralkyl, alkylaryl or heteroatom-containing ring;
and wherein the second electron donor compound B is an ester or an ether compound;
(iii) filtering, and if only one kind of internal electron donor was added in step (ii), then the adding the other kind of internal electron donor compound being added in this step, adding titanium tetrachloride, reacting for 0.5-3 h, filtering, repeating the steps of adding titanium tetrachloride and filtering 1-3 times; and
(iv) washing, drying and thus obtaining a spherical solid catalyst.

8. A method according to claim 7 wherein the sulphonyl compound is disulphonyl alkane, disulphonyl olefin, disulphonyl cyclic hydrocarbon, disulphonyl silane, disulphonyl, cyclosilane, disulphonyl dialkyl tin, disulphonyl dialkyl lead or heteroatom-containing derivatives; disulphonyl imine; disulphonyl phosphinidene; disulphonyl arsenous or heteroatom-containing derivatives; unsubstituted or substituted sulphonic anhydride, thio or seleno derivatives.

9. A method according to claim 7 wherein the sulphonyl compound is selected from the group consisting of:
di(trifluoromethylsulphonyl)methane;
[di(trifluoromethylsulphonyl)methyl]benzene;
1,1-di(trifluoromethylsulphonyl)-ethane;

[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethyl-amine;
[3,3-di-(trifluoromethylsulphonyl)-allyl]-benzene;
1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitrobenzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;
1-[di-(trifluoromethylsulphonyl)-methylene]-pyrimidine;
[di-(trifluoromethylsulphonyl)-methylene]-triphenyl-$\lambda^5$-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoro-methane;
di-(trifluoromethylsulphonyl)-vinylketone;
2,2-di-(trifluoromethylsulphonyl)-malonic ester;
[(dimethyl-$\lambda^4$-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitrobenzene)-hydrazine;
2,2-di-(isopropylamine)-1,1-(trifluoromethylsulphonyl)-ethylene;
1-(2,2-di-trifluoromethylsulphonyl-cyclopropyl)-ethanone;
1-(2,2-di-trifluoromethylsulphonyl-ethenyl)-4-methyl-benzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrifluoro-benzene;
1-(di-trifluoromethylsulphonyl-methyl)-4-tetra-but-2,3,5,6-tetrifluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrifluoro-4-hexyloxy-benzene;
N-phenyl-di(trifluoromethylsulphonyl)amine;
N-2,6-diisopropylphenyl-di(trifluoromethylsulphonyl)amine;
N-(4-methoxylphenyl)-di(trifluoromethylsulphonyl)amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxyethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl)-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl)amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene and trifluoromethylsulfonicanhydride.

10. A method according to claim 7 wherein the electron donor compound B is one or more-membered aliphatic carboxylic ester, aromatic carboxylic ester or diethers compounds.

11. A method according to claim 10 wherein the one or more-membered aliphatic carboxylic ester or aromatic carboxylic ester can be benzoates, phthalates, malonates, succinates, glutarates or pivalates compounds.

12. A method according to claim 10 wherein the diethers compounds are 1,3-diethers with formula (II):

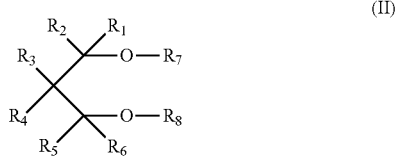

wherein $R_1$, $R_2$, $R_3$, $R_4$, $R_5$ and $R_6$ can be the same or different, and can be hydrogen, halogen atom, linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; $R_7$ and $R_8$ can be the same or different, and can be linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; groups of $R_1$-$R_6$ can form a ring by linkage.

13. A method for polymerizing propylene, comprising combining monomers comprising propylene monomers in the presence of a polymerization catalyst, wherein said polymerization catalyst is a catalyst comprising:
a) a titanium compound having at least one Ti-halogen bond;
b) a first electron donor compound A supported on a $MgCl_2$.nROH adduct, wherein n is 1.5-4, and R is hydrogen, $C_1$-$C_6$ alkyl or aryl, $C_1$-$C_{12}$ hydrocarbonyl; and
c) a second electron donor compound B supported on said $MgCl_2$.nROH adduct;
wherein the electron donor compound A is a sulphonyl compound of formula (I):

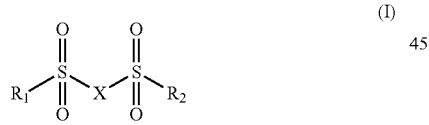

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups, wherein X is $C(R_3)(R_4)$, $Si(R_3)(R_4)$, $Sn(R_3)(R_4)$, $Pb(R_3)(R_4)$, $N(R_5)$, $P(R_6)$, $As(R_6)$, O, S, Se or Te, wherein $R_3$ and $R_4$ are identical or different, and $R_3$, $R_4$, $R_5$ and $R_6$ is hydrogen atom, halogen, unsubstituted or substituted alkyl, cycloalkyl, aryl, aralkyl, alkylaryl, alkyl alkenyl, alkenyl alkyl, alkyl alkynyl, heteroatom-containing ring or acyl, respectively, or $R_3$, $R_4$ and C constitute cycloalkyl or cycloalkenyl in the sulphonyl compound of formula (I);

$R_1$ and $R_2$ can be the same or different, and can each be hydrogen, halogen, unsubstituted or substituted alkyl, cycloalkyl, aryl, aralkyl, alkylaryl or heteroatom-containing ring;
and wherein the electron donor compound B is an ester or an ether compound;
and wherein the molar ratio of electron donor compound A to electron donor compound B is between 0.1:1 and 5:1;
and wherein the molar ratio of the total amounts of the two kinds of electron donors to $MgCl_2$.nROH is between 0.01:1 and 1:1;
and wherein the molar ratio of the titanium compound containing Ti-halogen bond to $MgC_2$.nROH is between 1:1 and 200:1;
and wherein an alkylaluminium compound is added as cocatalyst;
and wherein an organosiloxane compound is added as an external electron donor;
and wherein the molar ratio of aluminium to the titanium in the solid catalyst component is between 10:1 and 3000:1;
and wherein the molar ratio of aluminium to the silicon in the external electron donor compound is between 0.1:1 and 500:1.

14. A method according to claim 13 wherein the sulphonyl compound is disulphonyl alkane, disulphonyl olefin, disulphonyl cyclic hydrocarbon, disulphonyl silane, disulphonyl, cyclosilane, disulphonyl dialkyl tin, disulphonyl dialkyl lead or heteroatom-containing derivatives; disulphonyl imine; disulphonyl phosphinidene; disulphonyl arsenous or heteroatom-containing derivatives; unsubstituted or substituted sulphonic anhydride, thio or seleno derivatives.

15. A method according to claim 13 wherein the sulphonyl compound is selected from the group consisting of:
di(trifluoromethylsulphonyl)methane;
[di(trifluoromethylsulphonyl)methyl]benzene;
1,1-di(trifluoromethylsulphonyl)-ethane;
[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethylamine;
[3,3-di-(trifluoromethylsulphonyl)-allyl]-benzene;

1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitrobenzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;
1-[di-(trifluoromethylsulphonyl)-methylene]-pyrimidine;
[di-(trifluoromethylsulphonyl)-methylene]-triphenyl-$\lambda^5$-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoro-methane;
di-(trifluoromethylsulphonyl)-vinylketone;
2,2-di-(trifluoromethylsulphonyl)-malonic ester;
[(dimethyl-$\lambda^4$-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitro-benzene)-hydrazine;
2,2-di-(isopropylamine)-1,1-(trifluoromethylsulphonyl)-ethylene;
1-(2,2-di-trifluoromethylsulphonyl-cyclopropyl)-ethanone;
1-(2,2-di-trifluoromethylsulphonyl-ethenyl)-4-methyl-benzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrafluoro-benzene;
1-(di-trifluoromethylsulphonyl-methyl)-4-tetra-but-2,3,5,6-tetrafluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrifluoro-4-hexyloxy-benzene;
N-phenyl-di(trifluoromethylsulphonyl)amine;
N-2,6-diisopropylphenyl-di(trifluoromethylsulphonyl) amine;
N-(4-methoxylphenyl)-di(trifluoromethylsulphonyl) amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxylethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl)-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl) amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene and trifluoromethylsulfonicanhydride.

16. A method according to claim 13 wherein the electron donor compound B is one or more-membered aliphatic carboxylic ester, aromatic carboxylic ester or diethers compounds.

17. A method according to claim 16 wherein the one or more-membered aliphatic carboxylic ester or aromatic carboxylic ester can be benzoates, phthalates, malonates, succinates, glutarates or pivalates compounds.

18. A method according to claim 16 wherein the diethers compounds are 1,3-diethers with formula (II):

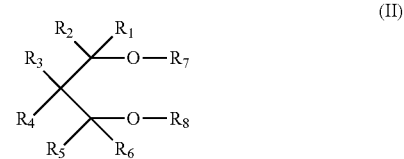

wherein $R_1$, $R_2$, $R_3$, $R_4$, $R_5$ and $R_6$ can be the same or different, and can be hydrogen, halogen atom, linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; $R_7$ and $R_8$ can be the same or different, and can be linear or branched $C_1$-$C_{20}$ alkyl, $C_3$-$C_{20}$ cycloalkyl, $C_6$-$C_{20}$ aryl, $C_7$-$C_{20}$ alkaryl or $C_7$-$C_{20}$ aralkyl; groups of $R_1$-$R_6$ can form a ring by linkage.

19. A catalyst for polymerizing propylene, comprising a titanium compound having at least one Ti-halogen bond, a first electron donor compound A supported on a MgCl$_2$.nROH adduct, wherein n is 1.5-4, and R is C$_1$-C$_4$ alkyl, and a second electron donor compound B supported on said MgCl$_2$.nROH adduct;
wherein the electron donor compound A is a sulphonyl compound of formula (I):

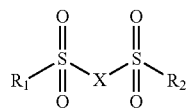

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups;
R$_1$ and R$_2$ can be the same or different, and can each be hydrogen, halogen, unsubstituted or substituted alkyl, cycloalkyl, aryl, aralkyl, alkylaryl or heteroatom-containing ring;
and wherein the electron donor compound B is an ester or an ether compound;
and wherein the molar ratio of electron donor compound A to electron donor compound B is between 0.1:1 and 5:1;
and wherein the molar ratio of the total amounts of the two kinds of electron donors to MgCl$_2$.nROH is between 0.01:1 and 1:1;
and wherein the molar ratio of the titanium compound containing Ti-halogen bond to MgCl$_2$.nROH is between 1:1 and 200:1;
and wherein the sulphonyl compound is disulphonyl alkane, disulphonyl olefin, disulphonyl cyclic hydrocarbon, disulphonyl silane, disulphonyl, cyclosilane, disulphonyl dialkyl tin, disulphonyl dialkyl lead or heteroatom-containing derivatives; disulphonyl imine; disulphonyl phosphinidene; disulphonyl arsenous or heteroatom-containing derivatives; unsubstituted or substituted sulphonic anhydride, thio or seleno derivatives.

20. A catalyst for polymerizing propylene, comprising a titanium compound having at least one Ti-halogen bond, a first electron donor compound A supported on a MgCl$_2$.nROH adduct, wherein n is 1.5-4, and R is C$_1$-C$_4$ alkyl, and a second electron donor compound B supported on said MgCl$_2$.nROH adduct;
wherein the electron donor compound A is a sulphonyl compound of formula (I):

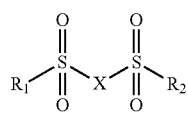

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups;
R$_1$ and R$_2$ can be the same or different, and can each be hydrogen, halogen, unsubstituted or substituted alkyl, cycloalkyl, aryl, aralkyl, alkylaryl or heteroatom-containing ring;
and wherein the electron donor compound B is an ester or an ether compound;
and wherein the molar ratio of electron donor compound A to electron donor compound B is between 0.1:1 and 5:1;
and wherein the molar ratio of the total amounts of the two kinds of electron donors to MgCl$_2$.nROH is between 0.01:1 and 1:1;
and wherein the molar ratio of the titanium compound containing Ti-halogen bond to MgCl$_2$.nROH is between 1:1 and 200:1;
and wherein the sulphonyl compound is selected from the group consisting of:
di(trifluoromethylsulphonyl)methane;
[di(trifluoromethylsulphonyl)methyl]benzene;
1,1-di(trifluoromethylsulphonyl)-ethane;
[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethylamine;
[3,3-di-(trifluoromethylsulphonyl)-allyl]-benzene;
1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitrobenzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;

1-[di-(trifluoromethylsulphonyl)-methylene]-pyrimidine;
[di-(trifluoromethylsulphonyl)-methylene]-triphenyl-λ⁵-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoromethane;
di-(trifluoromethylsulphonyl)-vinylketone;
2,2-di-(trifluoromethylsulphonyl)-malonic ester;
[(dimethyl-λ⁴-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitrobenzene)-hydrazine;
2,2-di-(isopropylamine)-1,1-(trifluoromethylsulphonyl)-ethylene;
1-(2,2-di-trifluoromethylsulphonyl-cyclopropyl)-ethanone;
1-(2,2-di-trifluoromethylsulphonyl-ethenyl)-4-methylbenzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrifluoro-benzene;
1-(di-trifluoromethylsulphonyl-methyl)-4-tetra-but-2,3,5,6-tetrifluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrifluoro-4-hexyloxy-benzene;
N-phenyl-di(trifluoromethylsulphonyl)amine;
N-2,6-diisopropylphenyl-di(trifluoromethylsulphonyl)amine;
N-(4-methoxyphenyl)-di(trifluoromethylsulphonyl)amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxylethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl)-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl)amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene and trifluoromethylsulfonicanhydride.

21. A method of preparing a catalyst for polymerizing propylene in nitrogen or argon under normal pressure, the method comprising the steps of:
(i) adding spherical magnesium chloride alcohol adduct particles to a solution of titanium tetrachloride at the reaction temperature of from −40 to 0° C. for 0.5-3 hours;
(ii) heating up gradually to 40-100° C., and adding a first electron donor compound A and/or a second electron donor compound B, and reacting for 0.5-3 hours;
wherein said first electron donor compound A is a sulphonyl compound of formula (I):

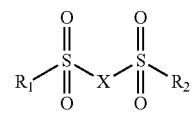

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups;
$R_1$ and $R_2$ can be the same or different, and can each be hydrogen, halogen, unsubstituted or substituted alkyl, cycloalkyl, aryl, aralkyl, alkylaryl or heteroatom-containing ring;
and wherein the second electron donor compound B is an ester or an ether compound;
and wherein the sulphonyl compound is disulphonyl alkane, disulphonyl olefin, disulphonyl cyclic hydrocarbon, disulphonyl silane, disulphonyl, cyclosilane, disulphonyl dialkyl tin, disulphonyl dialkyl lead or heteroatom-containing derivatives; disulphonyl imine;

disulphonyl phosphinidene; disulphonyl arsenous or heteroatom-containing derivatives; unsubstituted or substituted sulphonic anhydride, thio or seleno derivatives;

(iii) filtering, and if only one kind of internal electron donor was added in step (ii), then adding the other kind of internal electron donor compound being added in this step, adding titanium tetrachloride, reacting for 0.5-3 h, filtering, repeating the steps of adding titanium tetrachloride and filtering 1-3 times; and (iv) washing, drying and thus obtaining a spherical solid catalyst.

22. A method of preparing a catalyst for polymerizing propylene in nitrogen or argon under normal pressure, the method comprising the steps of:

(i) adding spherical magnesium chloride alcohol adduct particles to a solution of titanium tetrachloride at the reaction temperature of from −40 to 0° C. for 0.5-3 hours;

(ii) heating up gradually to 40-100° C., and adding a first electron donor compound A and/or a second electron donor compound B, and reacting for 0.5-3 hours;

wherein said first electron donor compound A is a sulphonyl compound of formula (I):

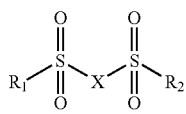

wherein,

X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups;

$R_1$ and $R_2$ can be the same or different, and can each be hydrogen, halogen, unsubstituted or substituted alkyl, cycloalkyl, aryl, aralkyl, alkylaryl or heteroatom-containing ring;

and wherein the second electron donor compound B is an ester or an ether compound;

and wherein the sulphonyl compound is selected from the group consisting of:
di(trifluoromethylsulphonyl)methane;
[di(trifluoromethylsulphonyl)methyl]benzene;
1,1-di(trifluoromethylsulphonyl)-ethane;
[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethyl-amine;
[3,3-di-(trifluoromethylsulphonyl)-allyl]-benzene;
1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitrobenzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;
1-[di-(trifluoromethylsulphonyl)-methylene]-pyrimidine;
[di-(trifluoromethylsulphonyl)-methylene]-triphenyl-$\lambda^5$-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoro-methane;
di-(trifluoromethylsulphonyl)-vinylketone;
2,2-di-(trifluoromethylsulphonyl)-malonic ester;
[(dimethyl-$\lambda^4$-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitrobenzene)-hydrazine;

2,2-di-(isopropylamine)-1,1-(trifluoromethylsulphonyl)-ethylene;
1-(2,2-di-trifluoromethylsulphonyl-cyclopropyl)-ethanone;
1-(2,2-di-trifluoromethylsulphonyl-ethenyl)-4-methyl-benzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrafluoro-benzene;
1-(di-trifluoromethylsulphonyl-methyl)-4-tetra-but-2,3,5,6-tetrafluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrifluoro-4-hexyloxy-benzene;
N-phenyl-di(trifluoromethylsulphonyl)amine;
N-2,6-diisopropylphenyl-di(trifluoromethylsulphonyl)amine;
N-(4-methoxylphenyl)-di(trifluoromethylsulphonyl)amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxyethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl)-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl)amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene and trifluoromethylsulfonicanhydride.

(iii) filtering, and if only one kind of internal electron donor was added in step (ii), then adding the other kind of internal electron donor compound being added in this step, adding titanium tetrachloride, reacting for 0.5-3 h, filtering, repeating the steps of adding titanium tetrachloride and filtering 1-3 times; and (iv) washing, drying and thus obtaining a spherical solid catalyst.

23. A method for polymerizing propylene, comprising combining monomers comprising propylene monomers in the presence of a polymerization catalyst, wherein said polymerization catalyst is a catalyst comprising:

a) a titanium compound having at least one Ti-halogen bond;

b) a first electron donor compound A supported on a $MgCl_2 \cdot nROH$ adduct, wherein n is 1.5-4, and R is hydrogen, $C_1$-$C_6$ alkyl or aryl, $C_1$-$C_{12}$ hydrocarbonyl; and c) a second electron donor compound B supported on said $MgCl_2 \cdot nROH$ adduct;

wherein the electron donor compound A is a sulphonyl compound of formula (I):

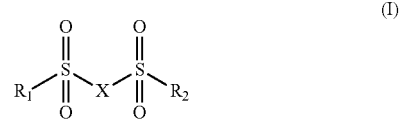

wherein,

X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups;

$R_1$ and $R_2$ can be the same or different, and can each be hydrogen, halogen, unsubstituted or substituted alkyl, cycloalkyl, aryl, aralkyl, alkylaryl or heteroatom-containing ring;

and wherein the electron donor compound B is an ester or an ether compound;

and wherein the molar ratio of electron donor compound A to electron donor compound B is between 0.1:1 and 5:1;

and wherein the molar ratio of the total amounts of the two kinds of electron donors to $MgCl_2 \cdot nROH$ is between 0.01:1 and 1:1;

and wherein the molar ratio of the titanium compound containing Ti-halogen bond to $MgC_2 \cdot nROH$ is between 1:1 and 200:1;

and wherein an alkylaluminium compound is added as cocatalyst;

and wherein an organosiloxane compound is added as an external electron donor;

and wherein the molar ratio of aluminium to the titanium in the solid catalyst component is between 10:1 and 3000:1;

and wherein the molar ratio of aluminium to the silicon in the external electron donor compound is between 0.1:1 and 500:1;

and wherein the sulphonyl compound is disulphonyl alkane, disulphonyl olefin, disulphonyl cyclic hydrocarbon, disulphonyl silane, disulphonyl, cyclosilane, disulphonyl dialkyl tin, disulphonyl dialkyl lead or heteroatom-containing derivatives; disulphonyl imine; disulphonyl phosphinidene; disulphonyl arsenous or heteroatom-containing derivatives; unsubstituted or substituted sulphonic anhydride, thio or seleno derivatives.

24. A method for polymerizing propylene, comprising combining monomers comprising propylene monomers in the presence of a polymerization catalyst, wherein said polymerization catalyst is a catalyst comprising:

a) a titanium compound having at least one Ti-halogen bond;

b) a first electron donor compound A supported on a $MgCl_2 \cdot nROH$ adduct, wherein n is 1.5-4, and R is hydrogen, $C_1$-$C_6$ alkyl or aryl, $C_1$-$C_{12}$ hydrocarbonyl; and c) a second electron donor compound B supported on said MgCl$_2$.nROH adduct;
wherein the electron donor compound A is a sulphonyl compound of formula (I):

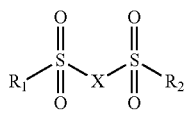

wherein,
X is selected from the group consisting of unsubstituted Group 14 elements, unsubstituted Group 15 elements, unsubstituted Group 16 elements, disubstituted Group 14 elements with a substituent which can be monocycle, polycycle, heteroatom-containing cyclic group or various aliphatic chainlike groups, and monosubstituted Group 15 elements with a substituent which can be monocycle, polycycle, heteroatom-containing cyclic group or various aliphatic chainlike groups;
R$_1$ and R$_2$ can be the same or different, and can each be hydrogen, halogen, unsubstituted or substituted alkyl, cycloalkyl, aryl, aralkyl, alkylaryl or heteroatom-containing ring;
and wherein the electron donor compound B is an ester or an ether compound;
and wherein the molar ratio of electron donor compound A to electron donor compound B is between 0.1:1 and 5:1;
and wherein the molar ratio of the total amounts of the two kinds of electron donors to MgCl$_2$.nROH is between 0.01:1 and 1:1;
and wherein the molar ratio of the titanium compound containing Ti-halogen bond to MgC$_2$.nROH is between 1:1 and 200:1;
and wherein an alkylaluminium compound is added as cocatalyst;
and wherein an organosiloxane compound is added as an external electron donor;
and wherein the molar ratio of aluminium to the titanium in the solid catalyst component is between 10:1 and 3000:1;
and wherein the molar ratio of aluminium to the silicon in the external electron donor compound is between 0.1:1 and 500:1;
and wherein the sulphonyl compound is selected from the group consisting of:
di(trifluoromethylsulphonyl)methane;
[di(trifluoromethylsulphonyl)methyl]benzene;
1,1-di(trifluoromethylsulphonyl)-ethane;
[chloro-(trifluoromethylsulphonyl)-methylsulphonyl]-trifluoro-methane;
[bromo-(trifluoromethylsulphonyl)-methylsulphonyl]-trifluoro-methane;
dichloro-di-trifluoromethylsulphonyl-methane;
dibromo-di-trifluoromethylsulphonyl-methane;
chloro-bromo-di-trifluoromethylsulphonyl-methane;
2-[2,2-di-(trifluoromethylsulphonyl)-ethenyl]-1H-pyrrole;
4-[2,2-di-(trifluoromethylsulphonyl)ethenyl]-morpholine;
2-[2,2-di-(trifluoromethylsulphonyl)-ethenyl]-1H-indole;
trifluoro-[methoxyl-(trifluoromethylsulphonyl)-methylsulphonyl]-methane;
1-chloro-1,1-di(trifluoromethylsulphonyl)-ethane;
1-bromo-1,1-di(trifluoromethylsulphonyl)-ethane;
4,4-di-(trifluoromethylsulphonyl)-butyl-1-ene;
2,3-di-(trifluoromethylsulphonyl)-propyl-1-ol;
1,1-di-(trifluoromethylsulphonyl)-pentane;
4-bromo-4,4-di-(trifluoromethylsulphonyl)-but-1-ene;
3-bromo-5-chloro-1,1-di-(trifluoromethylsulphonyl)-pentane;
3-bromo-1,1-di-(trifluoromethylsulphonyl)-nonane;
2,2-di-(trifluoromethylsulphonyl)-ethyl-benzene;
3-bromo-5,5-di-(trifluoromethylsulphonyl)-pentanoic acid;
1,1-di-(trifluoromethylsulphonyl)-propylene;
2,2-di-(trifluoromethylsulphonyl)-vinylamine;
[2,2-di-(trifluoromethylsulphonyl)-ethenyl]-dimethyl-amine;
[3,3-di-(trifluoromethylsulphonyl)-allyl]-benzene;
1-[2,2-di-(trifluoromethylsulphonyl)-ethenyl]-naphthalene;
4-[2,2-di-(trifluoromethylsulphonyl)-ethenyl]-2-ethyoxyl-phenol;
1-[2,2-di-(trifluoromethylsulphonyl)-ethenyl]-4-nitro-benzene;
(2,2-di-trifluoromethylsulphonyl-ethenyl)-benzene;
7,7-di-(trifluoromethylsulphonyl)-bicycle[4,1,0]-heptane;
1-[di-(trifluoromethylsulphonyl)-methyl]-4-methyl-benzene;
di-(trifluoromethylsulphonyl)-ethenone;
1-[di-(trifluoromethylsulphonyl)-methylene]-pyrimidine;
[di-(trifluoromethylsulphonyl)-methylene]-triphenyl-λ$^5$-phosphorus;
1-[di-(trifluoromethylsulphonyl)-methyl]-4-fluoro-benzene;
difluoro-di-trifluoromethylsulphonyl-methane;
3,2-di-trifluoromethylsulphonyl-ethyl cyclopropane carboxylate;
trifluoro-(fluoro-trifluoromethylsulphonyl-sulphonylmethyl)-methane;
1-(di-trifluoromethylsulphonyl-methyl)-2,3,4,5,6-pentafluorobenzene;
{4-[2,2-di-(trifluoromethylsulphonyl)-ethenyl]-phenyl}-diethyl-amine;
{4-[4,4-di-(trifluoromethylsulphonyl)-but-1,3-diethyl]-benzene}-dimethyl-amine;
2-[2,2-di-(trifluoromethylsulphonyl)-ethyl]-malonic acid;
2-[2,2-di-(trifluoromethylsulphonyl)-ethyl]-3-oxy-ethyl butyrate;
2-[2,2-di-(trifluoromethylsulphonyl)-ethyl]-2-bromo-diethyl malonate;
1,1,3,3-tetra-(trifluoromethylsulphonyl)-propane;
1,1,2,2-tetra-(trifluoromethylsulphonyl)-ethane;
trifluoro-[methoxyl-(trifluoromethylsulphonyl)-methylsulfonyl]-methane;
[di-(trifluoromethylsulphonyl)-methylsulfonyl]-trifluoromethane;
di-(trifluoromethylsulphonyl)-vinylketone;
2,2-di-(trifluoromethylsulphonyl)-malonic ester;
[(dimethyl-λ$^4$-sulfonamidesalkenyl)-trifluoromethylsulphonyl-methylsulfonyl]-trifluoro-methane;
1,1-di-ethylsulfanilamide-2,2-di(trifluoromethylsulphonyl)-ethylene;
1-[di-(trifluoromethylsulphonyl)-methyl]-4-iodo-benzene;
1-[di-(trifluoromethylsulphonyl)-methyl]-4-fluoro-benzene;
N-[di-(trifluoromethylsulphonyl)-methylene]-N'-(4-nitrobenzene)-hydrazine;
2,2-di-(isopropylamine)-1,1-(trifluoromethylsulphonyl)-ethylene;

1-(2,2-di-trifluoromethylsulphonyl-cyclopropyl)-ethanone;
1-(2,2-di-trifluoromethylsulphonyl-ethenyl)-4-methyl-benzene;
3,2-di-trifluoromethylsulphonyl-ethyl cyclopropanecarboxylate;
(1-p-tolyl-2,2-di-trifluoromethylsulphonyl-ethyl)-dimethyl phosphate;
1-(di-trifluoromethylsulphonyl-methylsulfonyl)-4-chloro-benzene;
(1-methyl-2,2-di-trifluoromethylsulphonyl-ethenyl)-phenyl-amine;
1-(di-trifluoromethylsulphonyl-methyl)-4-tetra-but-2,3,5,6-tetrifluoro-benzene;
1-(di-trifluoromethylsulphonyl-methyl)-4-tetra-but-2,3,5,6-tetrifluoro-biphenyl;
trimethyl-(pentafluorphenyl-di-trifluoromethylsulphonyl-methyl)-silane;
fluoro-tri-trifluoromethylsulphonyl-methane;
1-(di-trifluoromethylsulphonyl-methyl)-2,3,5,6-tetrifluoro-4-hexyloxy-benzene;
N-phenyl-di(trifluoromethylsulphonyl)amine;
N-2,6-diisopropylphenyl-di(trifluoromethylsulphonyl)amine;
N-(4-methoxylphenyl)-di(trifluoromethylsulphonyl)amine;
N-(3-chlorphenyl)-di(trifluoromethylsulphonyl)amine;
N-(2-fluorophenyl)-di(trifluoromethylsulphonyl)amine;
N-isobutyl-di(trifluoromethylsulphonyl)amine;
N-(2-methoxylethyl)-di(trifluoromethylsulphonyl)amine;
N-ethyl-di(trifluoromethylsulphonyl)amine;
N-benzyl-di(trifluoromethylsulphonyl)amine;
N-n-hexyl-di(trifluoromethylsulphonyl)amine;
N-(2-phenylethyl)-di(trifluoromethylsulphonyl)amine;
N-thienyl-di(trifluoromethylsulphonyl)amine;
N-cyclohexyl-di(trifluoromethylsulphonyl)amine;
N-(2-phenylphenyl)-di(trifluoromethylsulphonyl)amine;
N-(4-fluorophenyl)-di(trifluoromethylsulphonyl)amine;
N-(3-methylphenyl)-di(trifluoromethylsulphonyl)amine;
N-(4-methylphenyl)-di(trifluoromethylsulphonyl)amine;
N-(4-carboxyphenyl)-di(trifluoromethylsulphonyl)amine;
N-(3-carboxyphenyl)-di(trifluoromethylsulphonyl)amine;
di(trifluoromethylsulphonyl)amine;
N-fluoro-di(trifluoromethylsulphonyl)amine;
N-(2-pyridine)-di(trifluoromethylsulphonyl)amine;
N-(5-chloro-2-pyridyl)-di(trifluoromethylsulphonyl)amine;
N-trimethylsilyl-di(trifluoromethylsulphonyl)amine;
N-isopropyl-di(trifluoromethylsulphonyl)amine;
P-phenyl-di(trifluoromethylsulphonyl)phosphinidene and trifluoromethylsulfonicanhydride.

* * * * *